(12) United States Patent
Meguro

(10) Patent No.: US 6,327,117 B1
(45) Date of Patent: Dec. 4, 2001

(54) RECORDING/REPRODUCING APERTURES FOR DISC CARTRIDGE

(75) Inventor: Hiroshi Meguro, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/284,049

(22) PCT Filed: Jul. 31, 1998

(86) PCT No.: PCT/JP98/03435

§ 371 Date: Jun. 28, 1999

§ 102(e) Date: Jun. 28, 1999

(87) PCT Pub. No.: WO99/08277

PCT Pub. Date: Feb. 18, 1999

(30) Foreign Application Priority Data

Aug. 8, 1997 (JP) .................................................. 9-215214

(51) Int. Cl.[7] .................................................. G11B 23/03
(52) U.S. Cl. .................................................. 360/133
(58) Field of Search .............................. 360/133; 369/291

(56) References Cited

U.S. PATENT DOCUMENTS 4,851,947 * 7/1989 Kato ..................................... 360/133

FOREIGN PATENT DOCUMENTS

| 295025 | * 12/1988 | (EP) . |
| 0 348 216 A2 | 12/1989 | (EP) . |
| 0 348 937 A2 | 1/1990 | (EP) . |
| 0 353 000 A2 | 1/1990 | (EP) . |
| 0 736 870 A2 | 10/1996 | (EP) . |
| 64-70980 | * 3/1989 | (JP) . |

* cited by examiner

Primary Examiner—George J. Letscher
(74) Attorney, Agent, or Firm—Frommer Lawrence & Haug LLP; William S. Frommer; Matthew K. Ryan

(57) ABSTRACT

A disc cartridge for housing a magnetic disc of an increased recording capacity includes recording/reproducing apertures formed in the main cartridge body portion for exposing a portion of a signal recording area of the disc-shaped recording medium to outside across the inner and outer rims of the disc-shaped recording medium. The disc cartridge also includes a shutter member having shutter portions for opening/closing the recording/reproducing apertures and supporting portions provided on both sides of the direction of movement of the shutter portions and supported for movement by the main cartridge body portion and movement guide portions provided on both sides along the width-wise direction of the recording/reproducing apertures which is parallel to the movement direction of the shutter member. The supporting portions are engaged with the movement guide portion for movement. The recording/reproducing apertures are located so that one opening end facing the outer rim of the disc-shaped recording medium is located between the movement guide portions and a lateral side of the main cartridge body portion. The supporting portions of the shutter member are formed with cut-outs adapted for opening the recording/reproducing apertures as far as one opening edges of the apertures when the shutter member has been moved to a position of opening the recording/reproducing apertures.

13 Claims, 4 Drawing Sheets

RECORDING/REPRODUCING APERTURES FOR DISC CARTRIDGE

TECHNICAL FIELD

This invention relates to a disc cartridge holding a disc-shaped recording medium, such as a magnetic disc. More particularly, it relates to a disc cartridge in which recording/reproducing apertures provided in a main cartridge body portion holding a disc-shaped recording medium can be increased in size.

BACKGROUND ART

Up to now, a disc cartridge holding a disc-shaped recording medium such as a magnetic disc or a magneto-optical disc, has been in extensive use. This sort of the disc cartridge includes a main cartridge body portion combined from an upper cartridge half and a lower cartridge half. The disc-shaped recording medium is rotatably housed in a disc housing section provided in the interior of the main cartridge body portion.

In the upper and lower surfaces of the main cartridge body portion accommodating the disc-shaped recording medium are formed facing recording and/or reproducing apertures for partially exposing the signal recording area of the disc-shaped recording medium housed in the disc housing section across the inner and outer rims of the disc to outside and for permitting intrusion of recording/reproducing means provided on the recording/reproducing apparatus. The recording/reproducing apertures are opened and closed by a shutter member provided for movement on the main cartridge body portion.

The lower cartridge half constituting the lower surface of the main cartridge body portion is provided with a center opening at a mid portion of the disc housing section for permitting intrusion of a turntable on the recording/reproducing apparatus therein. This center opening causes a center hub provided at the center of the disc-shaped recording medium housed within the main cartridge body portion to be exposed to the lower surface side of the main cartridge body portion. The disc-shaped recording medium housed in the main cartridge body portion has its center hub clamped by the turntable intruded via the center opening in the main cartridge body portion so that the disc-shaped recording medium is rotated in unison with the turntable.

If the disc cartridge, configured as described above, is loaded on the recording/reproducing apparatus, the shutter member is moved to open the recording/reproducing apertures via which the recording/reproducing means of the recording/reproducing apparatus is intruded into the interior of the main cartridge body portion. The recording/reproducing means is moved across the inner and outer rims of the signal recording area of the disc-shaped recording medium in order to scan the signal recording area of the disc-shaped recording medium for recording/reproducing information signals.

Meanwhile, with recent tendency to multi-media, the information signals handled, such as video or audio data, are diversified and increased in volume. Moreover, the recording capacity of the disc cartridge is increasing. For recording the information signals of a large volume, there has been proposed a disc cartridge having information signals recorded thereon to higher recording density.

On the other hand, it is also proposed to use an outer rim portion of the disc-shaped recording medium as a signal recording area, not used thus far to this end, with a view to increasing the recording capacity of the information signals even although the disc-shaped recording medium of the same size as the conventional disc-shaped recording medium is held in the main cartridge body portion of the same size and shape as the conventional main cartridge body portion.

DISCLOSURE OF THE INVENTION

It is an object of the present invention to provide a disc cartridge whereby the signal recording area is enlarged to close to the outer rim area of the disc-shaped recording medium to realize a higher recording capacity of the disc-shaped recording medium.

It is another object of the present invention to provide a disc cartridge in which information signals can be reliably recorded and/or reproduced despite the fact that the signal recording area has been expanded to the outer rim area of the disc-shaped recording medium.

It is still another object of the present invention to provide a disc cartridge in which the recording/reproducing apertures provided in the main cartridge body portion are extended to the outer rim of the disc-shaped recording medium to enlarge the signal recording area to the outer rim area of the disc-shaped recording medium to increase the recording capacity of the disc-shaped recording medium.

It is yet another object of the present invention to provide a disc cartridge in which the recording/reproducing apertures increased in size can be reliably opened or closed by a shutter member movably mounted on the main cartridge body portion to realize positive protection of the disc-shaped recording medium housed in the main cartridge body portion.

For accomplishing the above objects, the present invention provides a disc cartridge having a shutter member having shutter portions for opening/closing the recording/reproducing apertures and supporting portions provided on both sides of the direction of movement of the shutter portions and supported for movement by the main cartridge body portion, and movement guide portions provided on both sides along the width-wise direction of the recording/reproducing apertures which is parallel to the movement direction of the shutter member. The supporting portions engage with the movement guide portion for movement. Each recording/reproducing aperture has one opening end facing the outer rim of the disc-shaped recording medium located between the movement guide portion and a lateral side of the main cartridge body portion.

With the present disc cartridge, the opening ends of the recording/reproducing apertures reaching the outer rim of the disc-shaped recording medium, disposed towards a lateral side of the main cartridge body portion, are extended as far as the outer rim of the disc-shaped recording medium. In keeping with the increased size of the apertures, the signal recording area of the disc-shaped recording medium is enlarged as far as its outer rim to realize an increased recording capacity of the disc-shaped recording medium.

Other objects and advantages of the present invention will become clearer from the following description of the preferred embodiments of the invention.

BEST MODE FOR CARRYING OUT THE INVENTION

Figure 1:
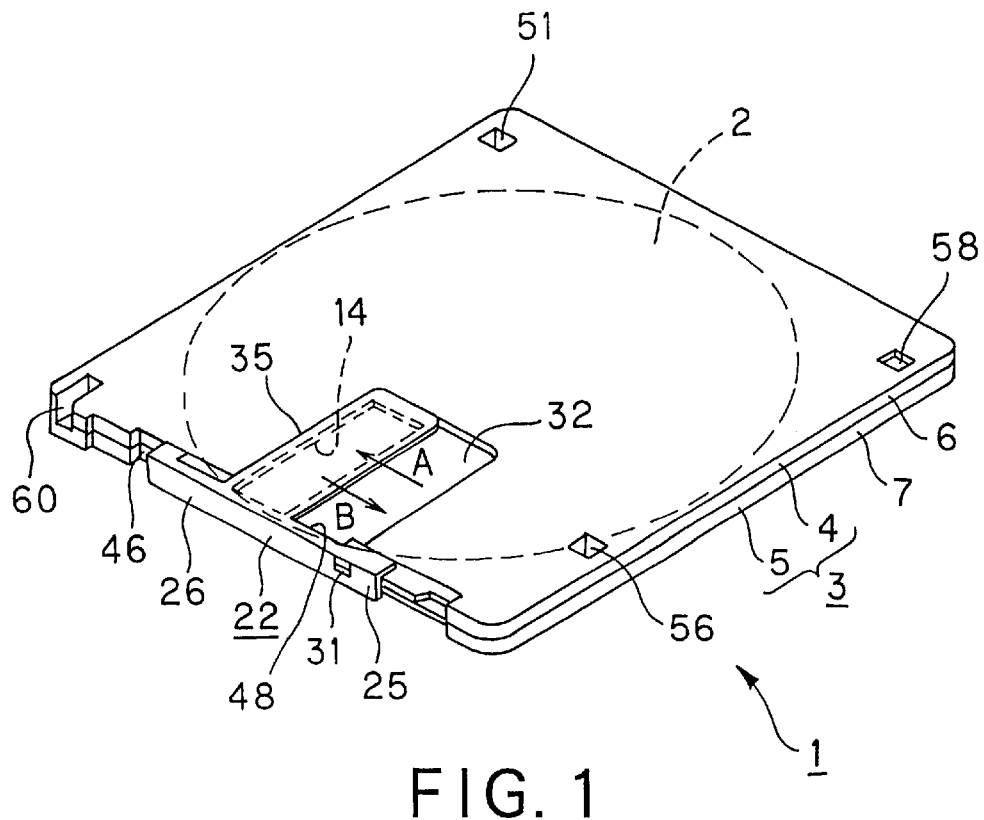
FIG. 1 is a perspective view showing a disc cartridge according to the present invention.

Referring to the drawings, a disc cartridge of the present invention will be explained in detail.

A disc cartridge 1 of the present embodiment includes a magnetic disc 2, with a diameter of 3.5 inch, rotatably housed in a main cartridge body portion 3. The magnetic disc 2, housed in the main cartridge body portion 3, is increased in its recording capacity by having the signal recording area extended to close to its outermost rim.

Figure 2:
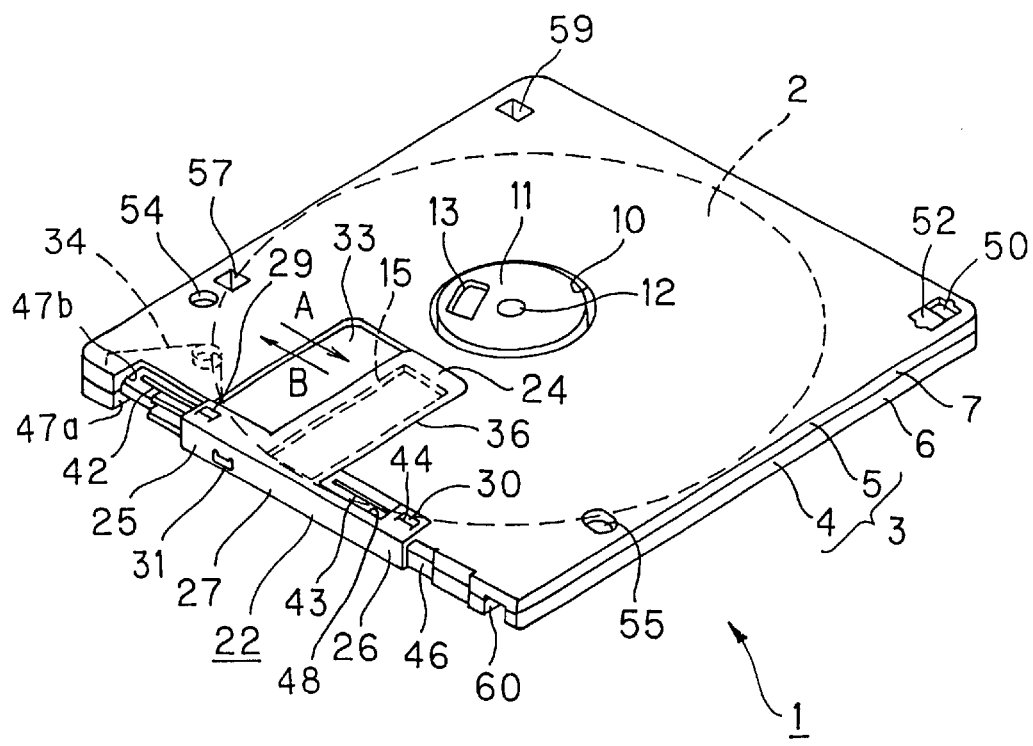
FIG. 2 is a perspective view of the disc cartridge looking from the bottom side.
Figure 3:
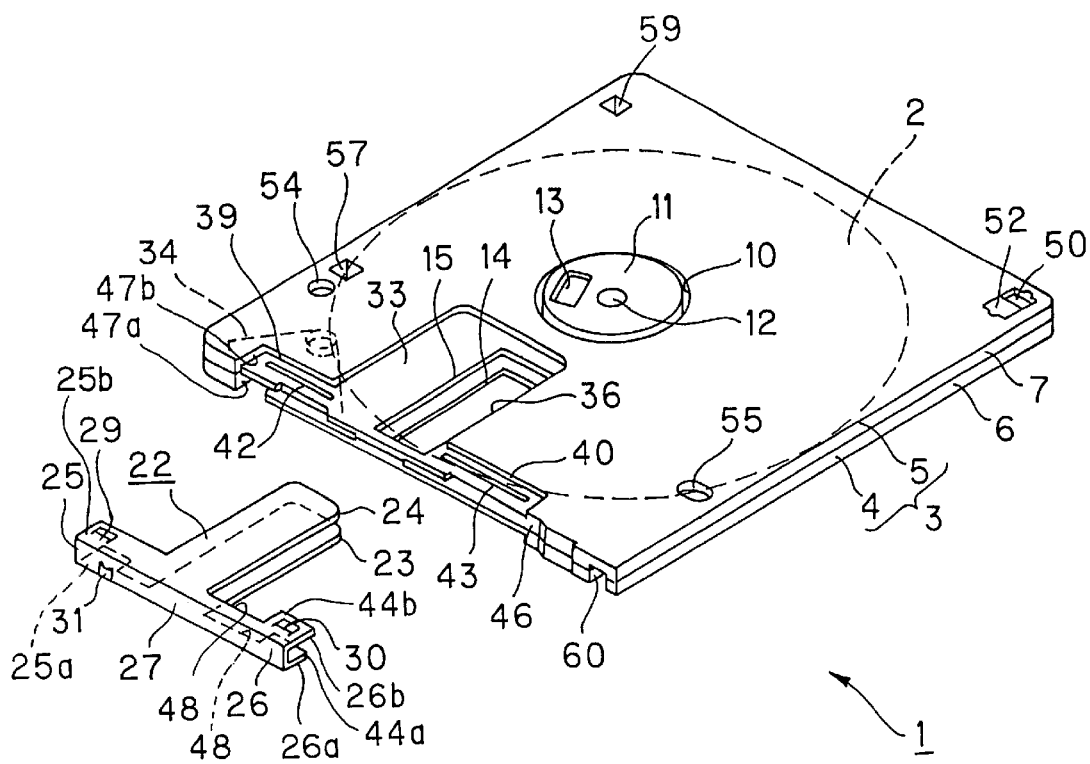
FIG. 3 is an exploded perspective view of the disc cartridge looking from the bottom side, shown with a shutter member of the disc cartridge removed.

The main cartridge body portion 3 is formed by abutting and interconnecting a pair of cartridge halves of a rectangular shape, that is an upper cartridge half 4 and a lower cartridge half 5, molded from a synthetic resin material. The outer rims of the upper cartridge half 4 and the lower cartridge half 5, making up the main cartridge body portion 3, are formed as-one with outer wall sections 6, 7 abutted together to complete an outer peripheral surface of the main cartridge body portion 3, as shown in FIGS. 1 and 2. The outer wall sections 6,7 are partially cut off on the front surface side. On the facing inner surfaces of the upper and lower cartridge halves 4, 5, disc housing section forming wall sections 9 formed as plural wall sections substantially inscribing the outer wall sections 6, 7 and which are abutted together to delimit the columnar-shaped disc housing section 8 are mounted upright, as shown in FIG. 3.

On the facing inner surfaces of the upper and lower cartridge halves 4, 5 making up the main cartridge body portion 3 are formed plural engagement projections and insertion holes passed through by these engagement projections in the vicinity of respective corners of the outer wall sections 6, 7. On the outer rims portions of the engagement projections provided on the upper cartridge half 4 are mounted upright annular abutment portions. When the engagement projections are passed through the insertion holes, the distal ends of the abutment portions are abutted against the outer rims of the insertion holes in the inner surface of the lower cartridge half 5.

With the upper cartridge half 4 and the lower cartridge half 5, constructed as described above, the outer wall sections 6, 7 and the disc housing section forming wall sections 9 are abutted together and the engagement projections are inserted into the insertion openings, so that the distal ends of the abutment portions are abutted against the outer rim of the insertion holes. The upper and lower cartridge halves 4, 5 are unified to constitute the main cartridge body portion 3 by abutting heating portions of a non-vibrating type welding device against the distal end of each engagement projection for fusing the distal end of each engagement projection to form a protuberant retainer, not shown, which is then retained by the outer rim of the insertion hole. Since no mechanical vibrations are imparted to the main cartridge body portion 3 when the upper and lower cartridge halves 4, 5 are bonded together to form the main cartridge body portion 3, there is no risk of dust and dirt being produced during bonding the upper and lower cartridge halves 4, 5 thus positively preventing dust and dirt from being affixed to the magnetic disc 2 held in the main cartridge body portion 3.

In the lower cartridge half 5 combined with the upper cartridge half 4 to form the main cartridge body portion 3, there is opened a circular center opening 10 for entrance of the circular table for constituting the center opening of the disc housing section 8, as shown in FIG. 2. In this circular center opening 10 is intruded the turntable of the recording/reproducing apparatus adapted for rotationally driving the magnetic disc 2 housed in the main cartridge body portion 3 when the disc cartridge 1 is loaded on the recording/reproducing apparatus. By this circular center opening 10, a center hub 11 mounted for closing a center opening, not shown, in the magnetic disc 2 housed in the main cartridge body portion 3, is exposed to outside from the lower cartridge half 5.

The center hub 11 has its flange extended on the outer rim of a fitting portion substantially of the same diameter as the diameter of the center opening of the magnetic disc 2 and is substantially shaped as a coupling. The flange has a center opening 12 passed through by a rotary shaft of the turntable. In the vicinity of the center opening 12 is formed a driving pin engagement hole 13 into which is intruded a driving member provided on the turntable.

Figure 4:
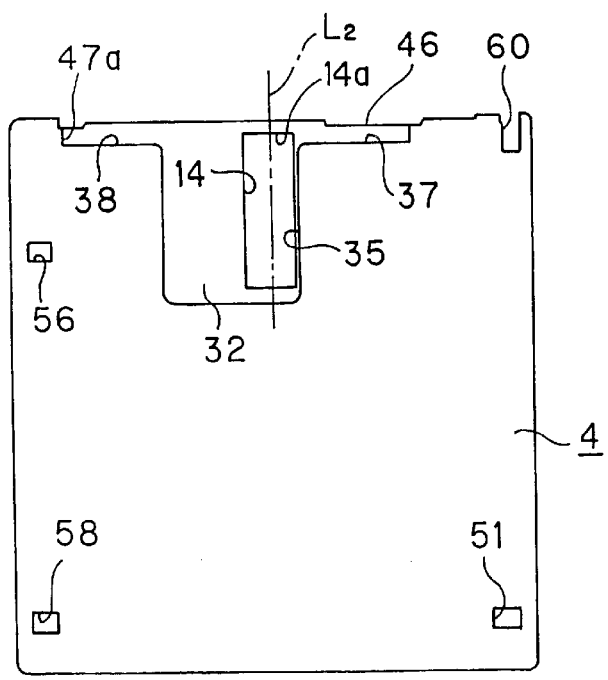
FIG. 4 is a plan view showing an upper cartridge half of the main cartridge body portion.
Figure 5:
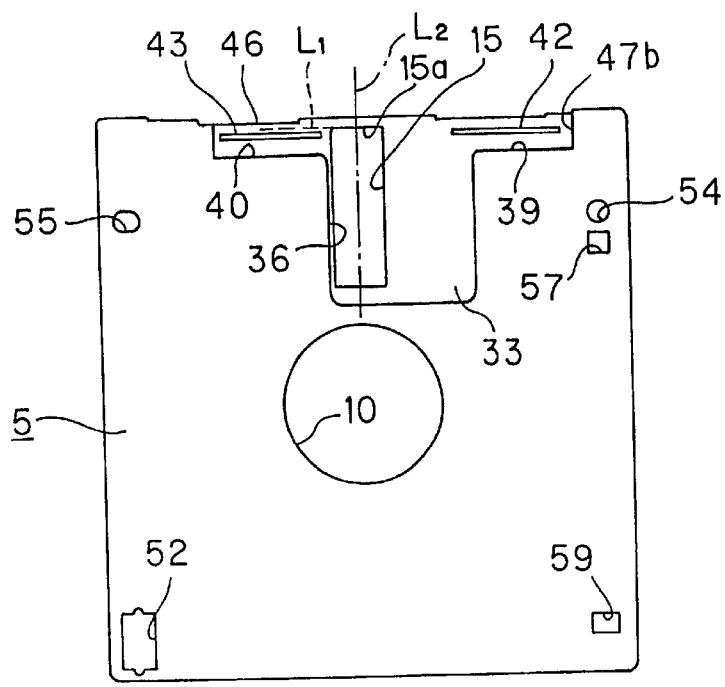
FIG. 5 is a plan view showing the lower cartridge half of the main cartridge body portion.

In the upper cartridge half 4 and the lower cartridge half 5, making up the upper and lower surfaces of the main cartridge body portion 3, respectively, there are formed facing recording/reproducing apertures 14, 15 for exposing at least a portion of the signal recording area of the magnetic disc 2 housed in the disc housing section 8 to outside across the inner and outer rims of the disc, as shown in FIGS. 3 to 5. These apertures 14, 15 are rectangular in profile and are formed at a mid portion along the width of the upper cartridge half 4 and the lower cartridge half 5 for extending from the position neighboring to the circular center opening 10 to the front side of the main cartridge body portion 3, as shown in FIGS. 4 and 5.

On the main cartridge body portion 3 is mounted a substantially T-shaped shutter member 22 for opening or closing the recording/reproducing apertures 14, 15 for movement in the direction indicated by arrows A and B in FIG. 2. The shutter member 22 is formed to a U-shaped cross-section by punching and warping a metal sheet material. The shutter member 22 is made up of a pair of parallel shutter portions 23, 24, facing each other, supporting portions 25, 26 protuberantly formed on both sides of the movement direction of the shutter portions 23, 24 for movably supporting the shutter member 22 on the main cartridge body portion 3 and a connecting piece 27 interconnecting the proximal sides of the shutter portions 23, 24 and also interconnecting the shutter portions 23, 24 and the supporting portions 25, 26, as shown in FIG. 3.

The shutter portions 23, 24 of the shutter member 22 are substantially rectangular in profile and are sized to be large enough to close the recording/reproducing apertures 14, 15.

The supporting portions 25, 26 are of a substantially U-shaped cross-section so as to fit on one lateral side of the main cartridge body portion 3 by the supporting pieces 25a, 25b and supporting pieces 26a, 26b protruded from both sides of the connecting piece 27 parallel to one another, as shown in FIG. 3. The supporting pieces 25a, 25b and the supporting pieces 26a, 26b, constituting the supporting portions 25, 26, are projected from both sides of the connecting piece 27 parallel to one another so as to run parallel to the shutter portions 23, 24 extended from both sides of the connecting piece 27.

Figure 6:
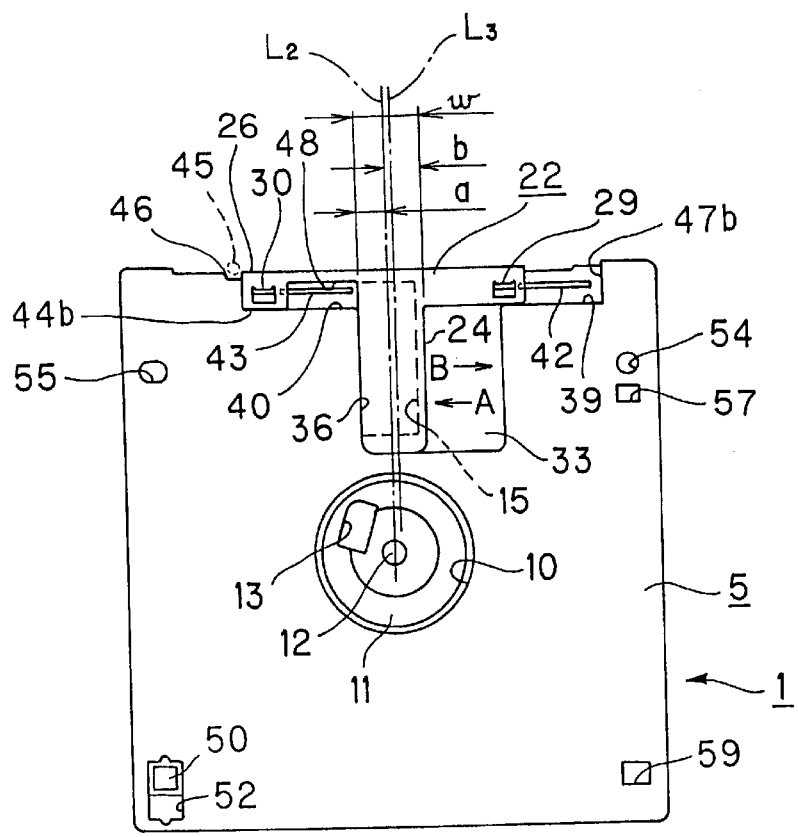
FIG. 6 is a plan view of the main cartridge body portion, looking from the bottom side of the main cartridge body portion, with the recording/reproducing apertures closed by the shutter member.
Figure 7:
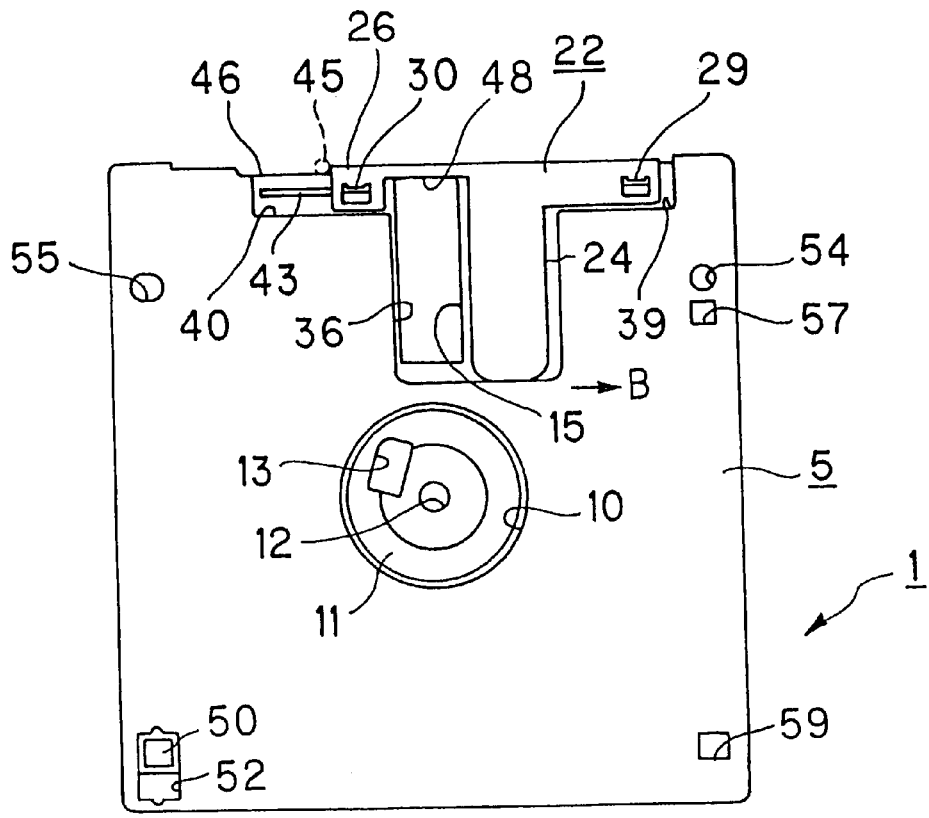
FIG. 7 is a plan view showing the main cartridge body portion, looking from the bottom side of the main cartridge body portion, with the recording/reproducing apertures opened by the shutter member.

The inner portions of the supporting portions 25, 26 of the supporting portions 25, 26 are warped in a direction perpendicular to the major surfaces of the supporting portions 25, 26 to form guide pieces 29, 30. These guide pieces 29, 30 are engaged in guide grooves 42, 43 provided in the lower cartridge half 5 and moved under guidance by these guide grooves 42, 43, as shown in FIGS. 6 and 7. The guide pieces 29, 30 are assured as to mechanical strength by punching and warping the inner portions of the supporting pieces 25b, 26b. Also, since the guide pieces 29, 30 are formed on the inner sides of the supporting pieces 25b, 26b, the inner sides of the supporting pieces 25b, 26b facing the supporting pieces 25b, 26b represent slide contact surfaces having sliding contact with both axial sides of the guide grooves 42, 43 engaged by the supporting pieces 25b, 26b, thus achieving stable movement of the guide pieces 29, 30 engaged with the guide grooves 42, 43.

When closing the recording/reproducing apertures 14, 15 provided in the main cartridge body portion 3, the centerline $L_3$ in the width-wise direction of the shutter portions 23, 24 is located closer to the lateral sides of the recording/reproducing apertures 14, 15 opposite to the lateral sides thereof facing abutments 35, 36 of the main cartridge body portion 3 than the centerline $L_2$ in the width-wise direction of the apertures 14, 15, as shown in FIG. 6. That is, the shutter portions 23, 24 are designed so that, when the recording/reproducing apertures 14, 15 are closed, as shown in FIG. 6, the width b from the centerline $L_2$ in the width-wise direction of the apertures 14, 15 to the lateral sides of the apertures 14, 15 opposite to the lateral sides thereof facing the abutments 35, 36 is larger than the width a from the centerline $L_2$ in the width-wise direction of the apertures 14, 15 to the above-mentioned lateral sides of the apertures 14, 15 facing the abutments 35, 36. The shutter portions 23, 24 are of a width w sufficient to close the recording/reproducing apertures 14, 15 in their entirety.

By forming the shutter portions 23, 24 in this manner, these apertures 14, 15 can be reliably closed even if position shift in the abutments 35, 36 formed in the upper and lower cartridge halves 4, 5 or the recording/reproducing apertures 14, 15 is produced or the apertures 14, 15 are larger than the prescribed size due to dimensional tolerances.

Towards one end of the connecting piece 27 is formed a spring retention piece 31 by warping a portion of the connecting piece 27. A shutter spring 34 provided on a corner on the front side of the lower cartridge half 5 has its one end retained by the spring retention piece 31. The shutter member 22 is perpetually biased by the shutter spring 34 into movement in a direction of closing the recording/reproducing apertures 14, 15 as indicated by arrow A in FIG. 2.

With the disc cartridge 1 according to the present invention, since the shutter member 22 is perpetually biased by the shutter spring 34 in the direction of closing the recording/reproducing apertures 14, 15, the recording/reproducing apertures 14, 15 are prevented from being inadvertently opened during non-use time such as during storage when the disc cartridge is not loaded on the recording/reproducing apparatus to prevent dust and dirt from entering the disc housing section 8 via the apertures 14, 15 to prevent deposition of dust and dirt on the magnetic disc 2 housed in the main cartridge body portion 3 or to prevent damage to the magnetic disc 2. When the disc cartridge 1 is loaded on the recording/reproducing apparatus, the shutter member 22 is engaged by a shutter opening/closure member of the recording/reproducing apparatus moved along the front side of the main cartridge body portion 3 so as to be moved along the main cartridge body portion 3 against the bias of the shutter spring 23 in the direction indicated by arrow B in FIG. 2 to open the recording/reproducing apertures 14, 15.

In the outer surface sides of the upper cartridge half 4 and the lower cartridge half 5 are formed guide recesses 32, 33 for encircling the recording/reproducing apertures 14, 15 for guiding the shutter portions 23, 24. In these guide recesses 32, 33 are formed the abutments 35, 36 adjacent to a lateral edge along the widths of the recording/reproducing apertures 14, 15. On these abutments 35, 36 are abutted the lateral side edges of the shutter portions 23, 24 of the shutter member 22 when the shutter member 22 is moved to the position of closing the apertures 14, 15. These abutments 35, 36 are formed adjacent to the lateral edge along the widthwise lateral edges of the recording/reproducing apertures 14, 15 for positively closing the apertures 14, 15 by the shutter portions 23, 24 of the shutter member 22.

In the upper cartridge half 4 are formed guide recesses 37, 38, opened in the front side of the upper cartridge half 4, on both sides of the movement direction of the shutter member 22, for guiding the movement of the supporting pieces 25a, 26a of the supporting portions 25, 26 provided on the shutter member 22. In the lower cartridge half 5 are similarly formed guide recesses 39, 40, opened in the front side of the lower cartridge half 5, on both sides of the movement direction of the shutter member 22, for guiding the movement of the supporting pieces 25b, 26b of the supporting portions 25, 26 provided on the shutter member 22. These guide recesses 39, 40 are provided with guide grooves 42, 43 extending along the movement direction of the shutter member 22. In these guide grooves 42, 43 are movably engaged guide pieces 29, 30 provided on the supporting pieces 25b, 26b of the supporting portions 25, 26 provided on the shutter member 22.

The supporting pieces 25a, 25b of the supporting portions 25, 26 of the shutter member 22 are extended into the guide recesses 37, 38 and 39, 40 of the upper and lower cartridge halves 4, 5 so as to be moved under guidance by these guide recesses 37, 38 and 39, 40. Thus, the distal ends of the supporting pieces 25a, 25b facing the upstanding sides of the guide recesses 37, 38 and 39, 40 operate as movement guides 44a, 44b for suppressing oscillations of the shutter member 22 for controlling the movement direction of the shutter member 22 during movement of the shutter member 22.

The upstanding sides of the guide recesses 38, 39 opposite to the movement direction of the shutter member 22 of opening the recording/reproducing apertures 14, 15 operate as abutments 47a, 47b against which the lateral sides of the supporting pieces 25a, 25b are abutted when the shutter member 22 is moved to the position of opening the apertures 14, 15. When the shutter member 22 is moved in the direction indicated by arrow B in FIG. 1 for opening the apertures 14, 15, the lateral sides of the supporting pieces 25b, 25b compress against the abutments 47a, 47b for controlling the movement position of the shutter member 22.

In the front sides of the upper cartridge half 4 and the lower cartridge half 5 are formed movement recesses 46 for extending along the movement direction of the shutter member 22, so that a shutter opening/closure member 45 provided on the recording/reproducing apparatus will be intruded and engaged therein, as shown in FIGS. 4 and 5.

The recording/reproducing apertures 14, 15 are provided for extending along the front sides of the upper and lower cartridge halves 4, 5, so that the opening ends 14a, 15a, facing the outer rim of the magnetic disc 2 representing the front sides of the upper and lower cartridge halves 4, 5 are located between the front sides of the upper and lower cartridge halves 4, 5 and the guide grooves 42, 43, as shown in FIGS. 4 and 5. That is, the opening ends 14a, 15a of the respectively apertures 14, 15 are located so that a broken line $L_1$ which is a line of extension of the opening ends 14a, 15a along the widths of the apertures 14, 15 is positioned between a slide contact surface 46 of the main cartridge body portion 3 and the guide grooves 42, 42. Thus, it is possible with these apertures 14, 15 to cause recording/reproducing means, such as a magnetic head, provided on the recording/reproducing apparatus, to face reliably the vicinity of the outermost rim of the magnetic disc 2.

Meanwhile, the shutter member 22 mounted on the main cartridge body portion 3 has to open reliably the recording/reproducing apertures 14, 15, expanded to the vicinity of the front side of the main cartridge body portion 3 so that the magnetic disc 2 will be exposed to outside up to the vicinity of the outermost rim of the magnetic disc 2. To this end, the supporting pieces 25b, 26b of the supporting portions 25, 26 provided on the shutter member 22 are formed with cut-outs 48, 48 for opening the opening ends 14a, 15b of the apertures 14, 15 when the shutter member 22 is moved to a position of opening the recording/reproducing apertures 14, 15, as shown in FIG. 7.

Moreover, the upper and lower cartridge halves 4, 5 are provided with a mistaken erasure inhibiting member 50 for preventing inadvertent erasure of information signals by mistaken recording of information signals on the magnetic disc 2. The mistaken erasure inhibiting member 50 is movably arranged in register with a detection hole 51 and an opening 52 provided at the corners on the back surface, as shown in FIG. 3.

In the bottom surface of the lower cartridge half 5 in the vicinity of both lateral sides along the width-wise direction are formed a pair of positioning holes 54, 55 for positioning the cartridge loading unit of the recording/reproducing apparatus. When loaded on the recording/reproducing apparatus, the disc cartridge 1 is positioned with respect to the cartridge loading unit by engagement of positioning projections on the recording/reproducing apparatus in the positioning holes 54, 55.

In the upper and lower cartridge halves 4, 5 are also formed recording capacity discriminating holes 56, 57 for discriminating the recording capacity of the magnetic disc housed in the disc cartridge. These recording capacity discriminating holes 56, 57 may also be formed as recesses opening on the lower cartridge half 5 constituting the lower surface of the main cartridge body portion 3 without passing through the upper and lower surfaces of the main cartridge body portion 3.

In one corner on the front side of the upper cartridge half 4 is formed a design parameter discriminating cut-out 60 for discriminating the design parameters of the disc cartridge 1 on loading the disc cartridge 1 on the cartridge loading unit of the recording/reproducing apparatus. The design parameters of the disc cartridge 1 are detected depending on whether or not a design parameter detection member on the recording/reproducing apparatus can be inserted into the design parameter discriminating cut-out 60.

Between the inner wall section of the upper cartridge half 4 and the magnetic disc 2 and between the inner wall section of the lower cartridge half 5 and the magnetic disc 2, there are arranged an upper protective sheet and a lower protective sheet secured to the upper cartridge half 4 and to the lower cartridge half 5, respectively. These upper and lower protective sheets are formed by non-woven cloths in the form of rings each having an outer diameter substantially equal to the diameter of the magnetic disc 2 and a center opening larger in diameter than the center opening of the magnetic disc 2. The upper and lower protective sheets are formed with cut-outs extending radially from the outer rim towards the center opening. These cut-outs are slightly larger than the opening sizes of the recording/reproducing apertures 14, 15 provided in the upper cartridge half 4 and in the lower cartridge half 5, respectively.

On the lower cartridge half 5 is secured a lifter plate, not shown, obtained on warping a thin metal plate or a sheet of a synthetic resin in the chevron shape. This lifter plate has its upstanding end thrust in a hoisting fashion by the lower surface of the lower protective sheet welded to the inner wall of the lower cartridge half 5. Thus, the lower protective sheet is thrust against the lower surface of the magnetic disc 2.

When the disc cartridge 1 of the present invention is loaded on the recording/reproducing apparatus and the magnetic disc 2 housed in the main cartridge body portion 3 is run in rotation to record or reproduce information signals, the upper protective sheet and the lower protective sheet are brought into sliding contact by the lifter operation with the upper and lower surfaces of the magnetic disc 2 with a light contact pressure. The magnetic disc 2 is torque-braked by the contact pressure of the upper and lower protective sheets so that it is rotated smoothly without rotational fluctuations.

The lifter plate is provided optionally. In the case of the disc cartridge in which is held a magnetic disc 2 rotated at an elevated velocity, the lifter is occasionally omitted for evading load application to the rotating magnetic disc 2.

In the above-described disc cartridge 1 according to the present invention, the state in which the shutter member 22 opens or closes the recording/reproducing apertures 14, 15 is explained with reference to the drawings.

First, if the disc cartridge is not as yet loaded on the recording/reproducing apparatus, the shutter member 22 is moved under the bias of the shutter spring 34 in the direction indicated by arrow A in FIG. 6, for closing the recording/reproducing apertures 14, 15 provided in the main cartridge body portion 3 as shown in FIG. 6. When the shutter member 22 is in the position of closing the recording/reproducing apertures 14, 15, the lateral edges of the shutter member 22 in the movement direction of the shutter portions 23, 24 compress against the abutment 46.

When the disc cartridge 1 is loaded on the recording/reproducing apparatus, the shutter opening/closure member 45 provided on the recording/reproducing apparatus is abutted against an end of the slide contact surface 46, at the same time as it is abutted against the supporting portion 26 of the shutter member 22. The shutter opening/closure member 45 is moved in the direction indicated by arrow B in FIG. 6 to thrust the supporting portion 26 to shift the shutter member 22 in the direction indicated by arrow B in FIG. 6. At this time, the shutter member 22 is supported by the main cartridge body portion 3 via supporting portions 25, 26 projected on both sides of the shutter portions 23, 24. Moreover, since the guide pieces 29, 30 are guided along the guide grooves 43, 44, the shutter member 22 is moved in stability along the main cartridge body portion 3.

As the supporting portion 26 is moved, the shutter portions 23, 24 of the shutter member 22 are moved in the direction indicated by arrow B in FIG. 7 to open the recording/reproducing apertures 14, 15 provided in the main cartridge body portion 3. When the shutter member 22 has been moved to the position of opening the apertures 14, 15, the cut-outs 48, 48 provided in the supporting pieces 25b, 26b constituting the supporting portions 25, 26 are in register with the opening ends 14a, 15a of the apertures 14, 15 to open reliably the recording/reproducing apertures 14, 15 enlarged up to the vicinity of the front side of the main cartridge body portion 3.

When the shutter member 22 is moved to open the recording/reproducing apertures 14, 15, the magnetic head provided on the recording/reproducing apparatus for constituting the recording/reproducing means is intruded via these apertures into the inside of the main cartridge body portion 3. The magnetic head intruded into the main cartridge body portion 3 scans the signal recording area of the magnetic disc 2 clamped by the turntable for rotation in unison therewith from the inner rim to close to the outermost rim of the magnetic disc 2 to record or reproduce information signals for the magnetic disc 2.

In the disc cartridge of the present invention, described above, since the opening ends 14a, 15a of the recording/reproducing apertures 14, 15 are extended to the outer rim of the magnetic disc 2 housed within the main cartridge body portion 3, the magnetic head can positively scan the signal recording area up to the vicinity of the outermost rim of the disc. By enlarging the signal recording area as far as the vicinity of the outermost rim of the magnetic disc 2, it is possible to increase the recording capacity of the disc 2. Moreover, since the shutter member 22 adapted for opening or closing the recording/reproducing apertures 14, 15 is provided with the supporting portions 25, 26 projected on both sides of the supporting portions 25, 26, the shutter member 22 is supported in stability with respect to the main cartridge body portion 3 and can be moved in stability on the main cartridge body portion 3 to enable the apertures 14, 15 to be opened or closed reliably.

In the above-described disc cartridge 1, the guide pieces 29, 30 formed on the supporting portions 25, 26 of the shutter member 22 are engaged in the guide grooves 42, 43 formed in the guide recesses 39, 40 of the lower cartridge half 5 for movably supporting the shutter member 22 with respect to the main cartridge body portion 3. Alternatively, the shutter member can be movably mounted on the main cartridge body portion by providing the inner surface of the shutter member facing the front side of the main cartridge body portion with engagement projections which are supported by the front side of the main cartridge body portion.

A modification of the present invention, in which engagement projections are provided on the inner surface of the connecting piece and in which the shutter member is movably mounted via these engagement projections on the main cartridge body portion, is explained. In the following description, parts or components common to those of the disc cartridge 1 are depicted by the same reference numerals and are not explained specifically.

Figure 8:
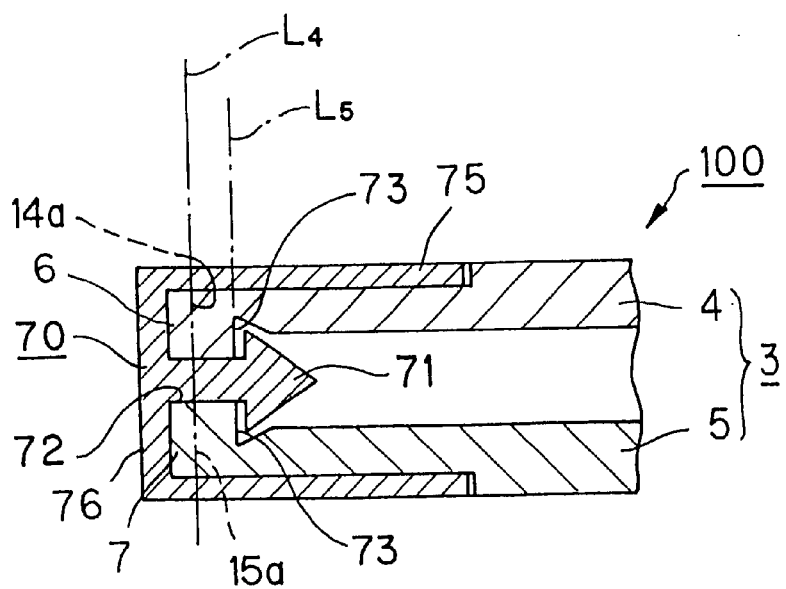
FIG. 8 is a partial longitudinal cross-sectional view showing a modification of a disc cartridge according to the present invention.

A shutter member 70, mounted on the disc cartridge 100 of the present modification, is molded from synthetic resin. Referring to FIG. 8, a pair of engagement projections 71, 71 of approximately wedge-shaped cross-section are protuberantly formed as-one with the portions of a connecting piece 76 of a shutter member 75 corresponding to the supporting portions projected from both sides of the shutter portions and which front to the front side of the main cartridge body portion 3, as shown in FIG. 8.

In the front side of the main cartridge body portion 3 on both sides of the recording/reproducing apertures 14, 15 are formed engagement grooves 72 for extending along the movement direction of the shutter member 70. The engagement grooves 72 are formed by partially cutting out abutting surfaces of the outer wall sections 6, 7 of the upper and lower cartridge halves 4, 5. The shutter member 70 is fitted on the outer surface of the main cartridge body portion 3 from the front side thereof and is mounted on the main cartridge body portion 3 with the engagement projections 71 inserted into the engagement grooves 72. The front side inner surface of the main cartridge body portion 3 is formed with engagement recesses 73, 73 engaged by pawl pieces 71a, 71b of the engagement projections 71 inserted into the engagement grooves 72, as shown in FIG. 8. The shutter member 70 is prevented from being detached from the main cartridge body portion 3 by the pawl pieces 71a, 71b of the engagement projections 71 inserted into the engagement recesses 73, 73 so that the shutter member 70 is prevented from oscillations about the supporting portions for the main cartridge body portion 3 as center and is movably mounted in stability on the main cartridge body portion 3.

The shutter member 70, mounted on the main cartridge body portion 3 with the engagement projections 71 engaged with the engagement grooves 72, is moved with the engagement projections 71 being guided along the engagement grooves 72, in the direction of opening or closing the recording/reproducing apertures 14, 15.

With the disc cartridge 100, shown in FIG. 8, a broken line $L_4$, corresponding to the projection of the positions of the opening ends 14a, 15a of the recording/reproducing apertures 14, 15 facing the vicinity of the outermost rim of the magnetic disc 2 housed in the main cartridge body portion 3, is located between the front surface of the main cartridge body portion 3 facing the connecting piece 76 of the shutter member 70 and a broken line $L_5$ corresponding to the extension of the upstanding sides of the engagement recesses 73, 73.

Although the disc cartridge according to the present invention employs a magnetic disc as a disc-shaped recording medium, this is merely illustrative and the recording medium may also be an optical disc or a magneto-optical disc other than the magnetic disc.

INDUSTRIAL APPLICABILITY

With the disc cartridge of the present invention, since the recording/reproducing apertures formed in the main cartridge body portion are extended to the outer rim of the disc-shaped recording medium housed in the main cartridge body portion, the signal recording area of the disc-shaped recording medium can be increased to realize the high recording capacity for information signals.

Since the shutter member has supporting portions protruded to both sides of the shutter portions, the shutter member can be moved in stability as it reliably opens the recording/reproducing apertures extended as far as the outer rim of the disc-shaped recording medium housed in the main cartridge body portion.

What is claimed is:

1. A disc cartridge comprising:

a main cartridge body portion for housing a disc-shaped recording medium having inner and outer rims;

recording/reproducing apertures formed in said main cartridge body portion for exposing a portion of a signal recording area of the disc-shaped recording medium across the inner and outer rims of the disc-shaped recording medium;

a shutter member having shutter portions for opening/closing the recording/reproducing apertures and supporting portions provided on both sides of the shutter portion in a direction of movement thereof and supported for movement by said main cartridge body portion; and movement guide portions in the main cartridge body portion on both sides of the recording/reproducing apertures in a width-wise direction thereof which is parallel to the movement direction of said shutter member, said supporting portions engaging said movement guide portions for reliably moving said shutter member between positions opening/closing the recording/reproducing apertures;

said recording/reproducing apertures having open ends thereof extending to an extent thereof toward a front side of said main cartridge body portion between said movement guide portions and said front side of said main cartridge body portion such that the signal recording area extends as far as the vicinity of the outer rim of the disc-shaped recording medium; and wherein said movement guide portions include guide grooves extending along the movement direction of said shutter member, and wherein guide pieces movably inserted into said guide grooves are formed on inner sides of the supporting portions of the shutter member so that the inner sides of said supporting portions represent slide contact surfaces making sliding contact with both axial sides of said guide grooves.

2. The disc cartridge according to claim 1 wherein the supporting portions of the shutter member include a connecting piece facing a lateral side of the main cartridge body portion and a pair of supporting pieces projected from said connecting piece parallel to said shutter portions and extended on the upper and lower sides of the main cartridge body portion.

3. The disc cartridge according to claim 1 wherein said main cartridge body portion has an abutment against which are abutted lateral edges of the shutter portions of the shutter member towards the movement direction thereof when the shutter portions have closed the recording/reproducing apertures;

the shutter portions of the shutter member being so formed that, when the shutter portions have closed the recording/reproducing apertures, the centerline along the width of the shutter portions is disposed closer to the lateral edge opposite to the lateral edge facing the abutment than the centerline in the width-wise direction of the recording/reproducing apertures.

4. The disc cartridge according to claim 1 wherein said main cartridge body portion has an abutment in adjacency to the opening edge of the recording/reproducing apertures, said abutment being an abutment against which lateral edges in the movement direction of the shutter portions of the shutter member are abutted when the shutter portions have closed the recording/reproducing apertures.

5. The disc cartridge according to claim 1 wherein the shutter portions of the shutter member are provided with guide pieces formed by folding portions of the supporting pieces facing said guide grooves, said guide pieces engaging in said guide grooves.

6. The disc cartridge according to claim 5 wherein the guide pieces are located at mid portions of said supporting pieces in a direction perpendicular to the movement direction of said supporting pieces with respect to said main cartridge body portion.

7. The disc cartridge according to claim 5 wherein the supporting portions of the shutter member operate as movement guide means for movement of the distal ends of the supporting pieces in the direction of opening/closing the recording/reproducing apertures.

8. The disc cartridge according to claim 5 wherein said main cartridge body portion is provided with an abutment against which are abutted lateral edges in the movement direction of said supporting pieces.

9. The disc cartridge according to claim 1 wherein the slide contact surfaces are in sliding contact with both sides of said guide grooves along the width-wise direction thereof.

10. The disc cartridge according to claim 1 wherein the supporting portions of the shutter member are formed with cut-outs adapted for opening the recording/reproducing apertures when the shutter member is moved to a position of opening the recording/reproducing apertures.

11. The disc cartridge according to claim 2 wherein said recording/reproducing apertures are formed in the upper and lower surfaces of the main cartridge body portion in register with each other and wherein said shutter member includes a pair of shutter portions for opening/closing said recording/reproducing apertures.

12. The disc cartridge according to claim 1 wherein said shutter member includes a connecting piece interconnecting said shutter portions and the supporting portions, engagement projections are formed for projecting from the surface of the connecting piece facing a lateral surface of the main cartridge body portion towards the inside of the main cartridge body portion and wherein engagement grooves engaged by said engagement projections are formed in a lateral surface of said main cartridge body portion.

13. The disc cartridge according to claim 12 wherein engagement portions engaged with said engagement projections are formed substantially parallel to a lateral surface of said main cartridge body portion;

said engagement projections are positioned closer to the inner rim of the disc-shaped recording medium than the surface of the opening edges of the recording/reproducing apertures facing the outermost rim of the disc-shaped recording medium.

* * * * *